March 6, 1934.   E. D. LILJA   1,949,968
INDUCTION MOTOR
Filed June 6, 1932
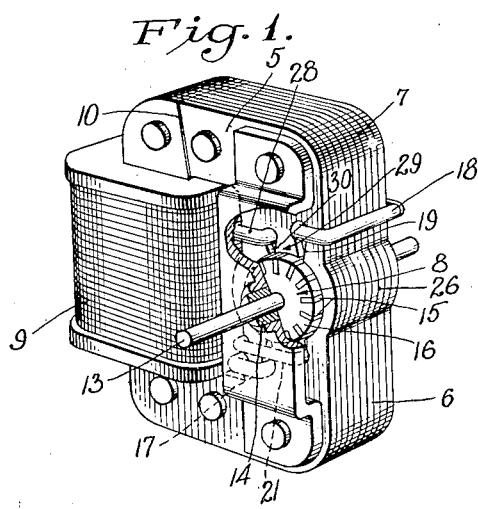
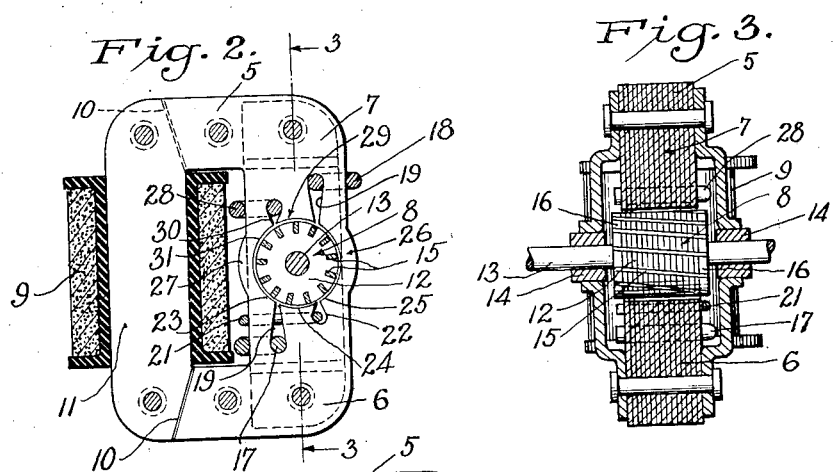
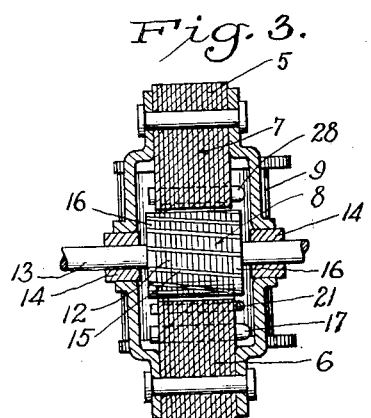
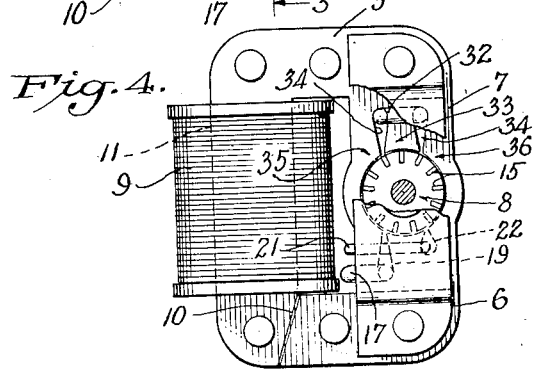
INVENTOR
Edgar D. Lilja
BY
ATTORNEYS Patented Mar. 6, 1934

1,949,968

UNITED STATES PATENT OFFICE 1,949,968

INDUCTION MOTOR

Edgar D. Lilja, Rockford, Ill., assignor to Howard D. Colman, Rockford, Ill.

Application June 6, 1932, Serial No. 615,535

10 Claims. (Cl. 172—278)

The invention relates generally to small shading ring induction motors and more particularly to those having stators of the core type.

Motors of the above character, particularly those having two pole stators, ordinarily operate at a speed only slightly below the synchronous speed of the motor as determined by the number of poles and the frequency of the alternating current used. For some applications, rotation at such high speed is objectionable from the standpoint of the amount of speed reduction gearing required and the noise produced in the rotation of such gearing.

The primary object of the present invention is to provide a motor of the above character in which the natural speed of rotation is reduced in a novel manner without decreasing the motor torque to an objectionable degree.

A more detailed object is to provide, in a motor of the above character, means acting to create a magnetic field opposing the main field and acting on the rotor to produce an electromagnetic braking action which increases with the speed of rotation of the rotor.

The invention also resides in the novel arrangement of the shading rings to obtain the braking action above mentioned.

Other objects and advantages of the invention will become apparent from the following detailed description taken in connection with the accompanying drawing, in which Figure 1 is a perspective view of a motor embodying the features of the present invention.

Fig. 2 is an actual size side elevational view of the motor shown in Fig. 1 with certain of the parts shown in section.

Fig. 3 is a sectional view taken along the line 3—3 of Fig. 2.

Fig. 4 is a side elevational view showing a modified form of the motor.

The motor shown by way of illustration has a rectangularly shaped stator 5 of the core type providing two poles 6 and 7, the faces of which define a recess in which a rotor 8 is rotatably mounted. A winding 9 of approximately 500 ampere turns encloses one leg of the stator and when energized by alternating current, maintains a high degree of saturation in all parts of the stator and rotor iron. Preferably, the laminations of which the stator is composed are each made in one integral piece slitted along a line 10 so that by inserting the core portions 11 of alternate laminations from opposite ends of the winding 9, a rigid field member is formed.

The rotor is of the so-called squirrel cage type including a cylindrical laminated iron core 12 fast on a shaft 13 journaled at opposite ends in bearings 14. The squirrel cage comprises a plurality of copper bars 15 set in the periphery of the core 12 and electrically connected at their opposite ends by copper disks 16. For a purpose to appear later, the rotor is constructed to possess low reactance and to this end, the local magnetic circuits around the bars 15 are interrupted by non-magnetic gaps as by setting the bars close to the surface of the rotor core.

Shifting of the magnetic field around the rotor is produced by the well known action of shading or short-circuited coils enclosing corresponding side portions of the poles. In the present instance, rings 17 and 18 are mounted on the poles 6 and 7 respectively extending through holes 19 communicating with the rotor recess. Preferably these rings enclose approximately one-third of their respective pole sections, each being formed from copper wire of No. 6, 7 or 8 standard B. & S. gauge. To produce a more progressive shifting of the field across the pole 6, a shading ring 21 is employed extending through a hole 22 and enclosing approximately two-thirds of the pole section including the same section as is enclosed by the ring 17. The size of the wire comprising the ring 21 may vary somewhat, No. 10 wire being employed herein. The face of the pole 6 is thus divided into double, single and unshaded areas 23, 24 and 25.

To effect proper distribution of the available unshaded flux to the rotor iron, the unshaded side tip of the pole 6 is extended around the rotor surface closely adjacent thereto by a magnetic connection 26 which preferably projects beyond the median plane between the poles and is integrally joined to the side tip of the pole 7 which is shaded by the ring 18. A similar magnetic connection 27 is provided between the poles on the opposite side of the rotor.

In the motor constructed as above described, it will be apparent that a magnetic field will be produced upon excitation of the winding 9, shifting in a clockwise direction around the rotor recess at 3600 R. P. M. when 60 cycle alternating current is employed. The rotor will actually turn under no load at approximately 3200 R. P. M. when the rings 17, 18 and 21 alone are employed to cause shifting of the field.

Means is provided which acts automatically to create a magnetic field opposing the field above referred to and acting to produce an electromagnetic braking action which reduces the speed of rotation of the rotor without a corresponding reduction in the torque developed. This means comprises a shading coil mounted on one of the poles in a manner such that currents will be induced creating a magnetic field which cooperates with the flux threading an unenclosed portion of the pole to cause shifting of the resultant field in a direction reverse to that of the main field. In the preferred form of motor shown in Figs. 1 to 3, the coil is in the form of a ring 28 enclosing a section of the pole 7 on the side thereof opposite the ring 18 leaving the intermediate pole section 29 unshaded. The ring 28 is made of wire approximately equivalent in sectional area to No. 9 gauge copper wire and extends through a hole 30 in the pole 7 corresponding in position to and of the same shape as the hole 22 through the pole 6.

When the stator above described is energized, currents will be induced in the ring 28 causing the magnetic flux threading the rotor from the area 31 to lag behind the flux threading the rotor from the adjacent unshaded section 29. A magnetic field is thus created which shifts in a counter-clockwise direction and in opposition to the main field resulting from the action of the rings 17, 18 and 21 and their adjacent unshaded pole sections. This opposing field obviously is weaker than the main field and acts in the same manner as the main field to induce currents in the rotor and thereby create a reverse torque causing the motor speed to be decreased. These currents, it will be observed, are proportional to the speed of relative motion between the auxiliary field and the rotor which speed at standstill will be 3600 R. P. M., the speed at which the auxiliary field shifts around the rotor. As the rotor starts to revolve, this speed of relative motion increases and the opposition offered by the auxiliary field is increased accordingly. In this way, the effect of the opposing field is a minimum at standstill resulting in a minimum reduction in the starting torque of the motor while at the same time obtaining the desired reduction in maximum speed.

Through the use of a rotor constructed as above described to possess low reactance, the efficiency of the auxiliary magnetic field in reducing the maximum speed without decreasing the torque to an objectionable degree is materially increased. With such a low reactance rotor, the impedance to flow of the braking currents does not increase materially with the increasing braking current frequency resulting from increasing rotor speed. However, the voltage producing these currents increases directly with the relative motion between the braking field and the rotor. These braking currents and therefore the braking torque they produce are a minimum at starting and increase with increasing rotor speed.

With the rotor and stator constructed as shown in Figs. 1 to 3, it has been found that the speed of the motor can be reduced to approximately 1300 R. P. M. while at the same time maintaining a relatively high starting torque. In this way, the same motor which is used for many applications where high speed and power output are desirable may also be adapted for applications requiring considerably slower speeds. These characteristics are obtained simply by changing the arrangement of the shading rings and without making any change in the construction of the rotor or field member of the motor as constructed for high speed operation. Moreover, with the shading rings arranged as shown in Figs. 1 to 3, the alternate laminations may be made in one piece and of the same shape.

The auxiliary field producing the braking effect and reduction in maximum speed may also be obtained by the shading ring arrangement shown in Fig. 4. In this form, only one ring 32 is employed on the pole 7, this ring enclosing the central section 33 of the pole and extending through holes 34. This ring cooperates with the adjacent unshaded section 35 to produce a magnetic field shifting in the same direction as the field produced by the pole 6 with the rings 17 and 21 thereon. In cooperation with the unenclosed section 36, the ring 32 creates a magnetic field shifting in a reverse direction and opposing the main field to reduce the motor speed in the manner above described.

I claim as my invention:

1. An alternating current induction motor comprising, in combination, a squirrel cage rotor, a field member providing two pole pieces facing said rotor and arranged to be polarized oppositely when the field member is excited, each of said pole pieces having two apertures extending therethrough and spaced apart laterally and also longitudinally of the pole pieces, a pair of shading rings extending through the respective apertures on one of said pole pieces and enclosing a common side portion of the pole section, one of said rings enclosing an additional adjacent section leaving the opposite side section unshaded, and a pair of shading rings on the other of said pole pieces extending through the respective apertures and enclosing opposite side portions of the pole section leaving an intermediate section unenclosed.

2. An alternating current induction motor comprising, in combination, a squirrel cage rotor, a field member providing two pole pieces facing said rotor and arranged to be oppositely polarized upon energization of the field member, two short-circuited rings on one of said pole pieces enclosing a common portion thereof with one of the rings enclosing an adjacent additional section of the pole piece leaving the opposite side section unshaded, a pair of shading coils on the other of said pole pieces enclosing opposite side portions thereof leaving the intermediate section of the pole piece unshaded.

3. An alternating current induction motor comprising, in combination, a rotor comprising a squirrel cage and an iron core supporting the same with the local magnetic circuits around the inductor bars interrupted by non-magnetic gaps, a field member providing two pole pieces facing said rotor and arranged to be oppositely polarized upon energization of the field member, two short-circuited rings enclosing corresponding side portions of said pole pieces to produce shifting of the magnetic field across the pole pieces, and a short-circuited shading ring on one of said pole pieces enclosing the side portion thereof opposite said first mentioned ring leaving an intermediate section of the pole piece unshaded.

4. An alternating current induction motor comprising, in combination, a squirrel cage rotor, a field member providing a plurality of pole pieces, means on one of said poles shading one side thereof while leaving the opposite side section of the pole piece unshaded, and means on another of said pole pieces shading opposite side sections of the pole piece while leaving an intermediate section unshaded.

5. An alternating current induction motor comprising, in combination, a squirrel cage rotor having a low reactance, a field member providing two pole pieces facing said rotor and arranged to be polarized oppositely upon energization of the field member, a shading ring enclosing one side portion of one of the pole pieces whereby to produce shifting of the magnetic field in one direction around the rotor, and shading means on the other pole piece cooperating with an unenclosed portion of the pole piece to produce shifting of the magnetic field around the rotor in the same direction as said first mentioned shading ring and also creating a magnetic field shifting around the rotor in the opposite direction.

6. An alternating current induction motor comprising, in combination, a squirrel cage rotor, a field member providing a plurality of pole pieces facing said rotor, shading means on one of said pole pieces partially enclosing the pole section and causing shifting of the main magnetic field around the rotor in one direction, and an independent shading ring cooperating with an unenclosed portion on another of said pole pieces to create a magnetic field acting in a direction to oppose said main field.

7. An alternating current induction motor comprising, in combination, a squirrel cage rotor, a field member providing a plurality of pole pieces facing said rotor, shading means on one of said pole pieces partially enclosing the pole section and causing shifting of the main magnetic field around the rotor in one direction, and means on one of said pole pieces cooperating with an unenclosed section of the pole piece to create an auxiliary magnetic field shifting in a direction reverse to said main field.

8. An alternating current induction motor comprising, in combination, a squirrel cage rotor having a low reactance, a field member providing at least two pole pieces facing said rotor and arranged to be polarized oppositely upon energization of the field member, a shading ring enclosing one side portion of one of the pole pieces whereby to produce shifting of the magnetic field in one direction around the rotor, and a shading ring on another of said pole pieces enclosing an intermediate section of the pole piece leaving the opposite side sections of the pole piece unenclosed.

9. An alternating current induction motor comprising, in combination, a squirrel cage rotor, a field member providing at least two pole pieces facing said rotor and arranged to be polarized oppositely upon energization of the field member, a shading ring enclosing a side portion of one of said pole pieces and a shading ring enclosing an intermediate section of another pole piece leaving opposite side portions of the latter pole piece unenclosed.

10. A field member for an alternating current induction motor having a plurality of pole pieces cooperating to define a rotor recess, shading means on one of said poles acting to produce shifting of the magnetic field around the rotor recess in one direction when the field member is energized by alternating current, and shading means on another of said poles producing a lesser degree of shading than said first mentioned shading means and shifting of the magnetic field across the face of the latter pole piece in a direction opposite to the direction of shifting produced by said first mentioned shading means.

EDGAR D. LILJA.